United States Patent
Bazrafkan et al.

(10) Patent No.: US 11,797,864 B2
(45) Date of Patent: Oct. 24, 2023

(54) SYSTEMS AND METHODS FOR CONDITIONAL GENERATIVE MODELS

(71) Applicant: FotoNation Limited, Galway (IE)

(72) Inventors: Shabab Bazrafkan, Galway (IE); Peter Corcoran, Galway (IE)

(73) Assignee: FotoNation Limited

( * ) Notice: Subject to any disclaimer, the term of this patent is extended or adjusted under 35 U.S.C. 154(b) by 1263 days.

(21) Appl. No.: 16/194,211

(22) Filed: Nov. 16, 2018

(65) Prior Publication Data

US 2019/0385019 A1   Dec. 19, 2019

Related U.S. Application Data

(60) Provisional application No. 62/686,472, filed on Jun. 18, 2018.

(51) Int. Cl.
| | |
|---|---|
| *G06N 20/00* | (2019.01) |
| *G06N 3/094* | (2023.01) |
| *G06N 7/00* | (2023.01) |
| *G06N 3/08* | (2023.01) |
| *G06N 3/084* | (2023.01) |
| *G06N 3/088* | (2023.01) |
| *G06N 3/045* | (2023.01) |
| *G06V 10/764* | (2022.01) |
| *G06V 10/774* | (2022.01) |

(Continued)

(52) U.S. Cl.
CPC ............. *G06N 3/094* (2023.01); *G06N 3/045* (2023.01); *G06N 3/08* (2013.01); *G06N 3/084* (2013.01); *G06N 3/088* (2013.01); *G06N 7/00* (2013.01); *G06N 20/00* (2019.01); *G06V 10/764* (2022.01); *G06V 10/774* (2022.01); *G06V 10/82* (2022.01); *G06V 40/168* (2022.01); *G06F 18/214* (2023.01); *G06F 18/2431* (2023.01)

(58) Field of Classification Search
CPC ........... G06N 20/00; G06N 7/00; G06N 3/08; G06N 3/084; G06N 3/088; G06N 3/0454; G06N 99/005; G06N 3/094; G06K 9/6256; G06K 9/628
See application file for complete search history.

(56) References Cited

U.S. PATENT DOCUMENTS 10,152,970 B1 * 12/2018 Olabiyi ................. G10L 13/027
10,650,306 B1 *  5/2020 Kumar ................. G06N 3/0472
(Continued)

OTHER PUBLICATIONS

Miyato et Koyama "cGANs with Projection Discriminator" Feb. 15, 2018, arXiv: 1802.05637v1, pp. 1-21. (Year: 2018).*

(Continued)

*Primary Examiner* — Miranda M Huang
*Assistant Examiner* — Chase P. Hinckley
(74) *Attorney, Agent, or Firm* — Lerner David LLP

(57) ABSTRACT

Systems and methods for training a conditional generator model are described. Methods receive a sample, and determine a discriminator loss for the received sample. The discriminator loss is based on an ability to determine whether the sample is generated by the conditional generator model or is a ground truth sample. The method determines a secondary loss for the generated sample and updates the conditional generator model based on an aggregate of the discriminator loss and the secondary loss.

18 Claims, 10 Drawing Sheets
(7 of 10 Drawing Sheet(s) Filed in Color)

(51) Int. Cl.
*G06V 10/82* (2022.01)
*G06V 40/16* (2022.01)
*G06F 18/214* (2023.01)
*G06F 18/2431* (2023.01)

(56) References Cited

U.S. PATENT DOCUMENTS

| | | | | |
|---|---|---|---|---|
| 10,783,875 | B2* | 9/2020 | Hosseini-Asi | G10L 15/063 |
| 11,048,999 | B2* | 6/2021 | Miyato | G06T 7/143 |
| 11,106,182 | B2* | 8/2021 | Hosseini-Asi | G06N 3/045 |
| 11,188,783 | B2* | 11/2021 | Cricri | G06N 3/0472 |
| 11,250,329 | B2* | 2/2022 | Karras | G06N 3/084 |
| 11,335,118 | B2* | 5/2022 | Kaneko | G06N 3/088 |
| 11,501,438 | B2* | 11/2022 | Xu | G06F 17/18 |
| 2018/0314716 | A1* | 11/2018 | Kim | G06T 1/20 |
| 2019/0046068 | A1* | 2/2019 | Ceccaldi | G06K 9/6271 |
| 2019/0130903 | A1* | 5/2019 | Sriram | G10L 15/20 |
| 2019/0147320 | A1* | 5/2019 | Mattyus | G06V 10/82 382/155 |
| 2019/0147333 | A1* | 5/2019 | Kallur Palli Kumar | G06N 3/0454 706/25 |
| 2019/0197368 | A1* | 6/2019 | Madani | G06K 9/6256 |
| 2019/0214135 | A1* | 7/2019 | Wu | G16H 30/40 |
| 2019/0236759 | A1* | 8/2019 | Lai | G06N 3/047 |
| 2019/0244681 | A1* | 8/2019 | Gurcan | G01N 33/5005 |
| 2019/0279075 | A1* | 9/2019 | Liu | G06N 3/088 |
| 2019/0295302 | A1* | 9/2019 | Fu | G06T 11/60 |
| 2019/0333623 | A1* | 10/2019 | Hibbard | A61N 5/1031 |
| 2019/0355103 | A1* | 11/2019 | Baek | G06N 3/088 |
| 2019/0385346 | A1* | 12/2019 | Fisher | G06F 40/109 |
| 2020/0134473 | A1* | 4/2020 | Miyato | G06N 3/0454 |
| 2020/0210842 | A1* | 7/2020 | Baker | G06N 20/00 |
| 2020/0294201 | A1* | 9/2020 | Planche | G06F 30/27 |
| 2021/0249142 | A1* | 8/2021 | Lau | G06T 7/11 |
| 2021/0287073 | A1* | 9/2021 | Miyato | G06K 9/6298 |

OTHER PUBLICATIONS

Chrysos et al., "Robust Conditional Generative Adversarial Networks" May 22, 2018, arXiv: 1805.08657v1, pp. 1-15. (Year: 2018).*
Bazrafkan et al., "Versatile Auxiliary Classifier + Generative Adversarial Network (VAC+GAN)" May 1, 2018, arXiv: 1805.00316v1, pp. 1-10. (Year: 2018).*
Bazrafkan et al., "Versatile Auxiliary Regressor with Generative Adversarial network (VAR+GAN)" May 28, 2018, arXiv: 1805.10864v1, pp. 1-14. (Year: 2018).*
Yang et al., "Unsupervised Text Style Transfer using Language Models as Discriminators" May 31, 2018, arXiv: 1805.11749v2, pp. 1-12. (Year: 2018).*
Ghafoorian et al., "EL-GAN: Embedding Loss Driven Generative Adversarial Networks for Lane Detection" Jun. 14, 2018, arXiv: 1806.05525v1, pp. 1-14. (Year: 2 018).*
Zhu et al., "Toward Multimodal Image-to-Image Translation" May 2, 2018, arXiv: 1711.11586v3, pp. 1-12. (Year: 2018).*
Li et al., "Facial Image Attributes Transformation via Conditional Recycle Generative Adversarial Networks" May 11, 2018, pp. 511-521. (Year: 2018).*
Di et al., "GP-GAN: Gender Preserving GAN for Synthesizing Faces from Landmarks" Apr. 25, 2018, arXiv: 1710.00962v2. (Year: 2018).*
Jaiswal et al., "Bidirectional Conditional Generative Adversarial Networks" Mar. 15, 2018, arXiv: 1711.07461v2, pp. 1-17. (Year: 2018).*
Russo et al., "From source to target and back: Symmetric Bi-Directional Adaptive GAN" Nov. 29, 2017, arXiv: 1705.08824v2. (Year: 2017).*
Wang et al., "Every Smile is Unique: Landmark-Guided Diverse Smile Generation" Mar. 28, 2018, arXiv: 1802.01873v3. (Year: 2018).*

Belghazi et al., "Mutual Information Neural Estimation" Jun. 7, 2018, arXiv: 1801.04062v4. (Year: 2018).*
Juefei-Xu et al., "Gang of GANs: Generative Adversarial Networks with Maximum Margin Ranking" Apr. 17, 2017. (Year: 2017).*
Lin et al., "ST-GAN: Spatial Transformer Generative Adversarial Networks for Image Compositing" Mar. 5, 2018, arXiv: 1803.01837v1, pp. 1-13. (Year: 2018).*
Bazrafkan et al., "Face Synthesis with Landmark Points from Generative Adversarial Networks and Inverse Latent Space Mapping" Feb. 1, 2018, arXiv: 1802.00390, pp. 1-5. (Year: 2018).*
Huang et al., "Multimodal Unsupervised Image-to-Image Translation" Apr. 12, 2018, arXiv: 1804.04732v1, pp. 1-22. (Year: 2018).*
Wang et al., "High-Resolution Image Synthesis and Semantic Manipulation with Conditional GANs" Nov. 30, 2017, arXiv: 1711.11585v1, pp. 1-13. (Year: 2017).*
Hwang et al., "Learning Beyond Human Expertise with Generative Models for Dental Restorations" Mar. 30, 2018, arXiv: 1804.00064v1, pp. 1-18. (Year: 2018).*
Johnson et al., "Composite Functional Gradient Learning of Generative Adversarial Models" Jun. 8, 2018, arXiv: 1801.06309v2, pp. 1-19. (Year: 2018).*
Lee et al., "Stochastic Adversarial Video Prediction" Apr. 4, 2018, arXiv: 1804.01523v1, pp. 1-26. (Year: 2018).*
Makhzani, Alireza "Implicit Autoencoders" May 24, 2018, arXiv: 1805.09804v1, pp. 1-11. (Year: 2018).*
McDermott et al., "Semi-supervised Biomedical Translation with Cycle Wasserstein Regression GANs" Apr. 26, 2018, pp. 1-8. (Year: 2018).*
Yoon et al., "RadialGAN: Leveraging multiple datasets to improve target-specific predictive models using Generative Adversarial Networks" Jun. 7, 2018, arXiv: 1802.06403v2, pp. 1-9. (Year: 2018).*
Wang et al., "High-Quality Facial Photo-Sketch Synthesis using Multi-Adversarial Networks" Mar. 3, 2018, arXiv: 1710.10182v2, pp. 1-8. (Year: 2018).*
Zhang et al., "Decoupled Learning for Conditional Adversarial Networks" Jan. 21, 2018, arXiv: 1801.06790v1, pp. 1-9. (Year: 2018).*
Lu et al., "Conditional CycleGAN for Attribute Guided Face Image Generation" May 28, 2017, arXiv: 1705.09966v1, pp. 1-9. (Year: 2017).*
Deng et al., "UV-GAN: Adversarial Facial UV Map Completion for Pose-invariant Face Recognition" Dec. 13, 2017, arxiv: 1712.04695v1, pp. 1-10. (Year: 2017).*
Hosseini-Asi et al., "A Multi-Disciminator CycleGAN for Unsupervised Non-Parallel Speech Domain Adaptation" May 14, 2018, arXiv : 1804.00522v3, pp. 1-7. (Year: 2018).*
Zhao et al., "Modular Generative Adversarial Networks" Apr. 10, 2018, arXiv: 1804.03343v1, pp. 1-18. (Year: 2018).*
"Face Detection using Haar Cascades", OpenCV: Open Source Computer Vision, 2018, 3 pgs.
Arjovsky et al., "Wasserstein Generative Adversarial Networks", Proceedings of the 34th International Conference on Machine Learning, 2017, 10 pgs.
Asthana et al., "Incremental Face Alignment in the Wild", Proceedings of the IEEE Conference on Computer Vision and Pattern Recognition, Jun. 23-28, 2014, 8 pgs.
Bazrafkan et al., "Versatile Auxiliary Classifier + Generative Adversarial Network (VAC+GAN): Training Conditional Generators", arXiv:1805.00316v1 [eess.IV], May 1, 2018, 10 pgs.
Bergstra et al., "Theano: Deep Learning on GPUs with Python", NIPS 2011, BigLearning Workshop, Granada, Spain, 2011, 4 pgs.
Berthelot et al., "BEGAN: Boundary Equilibrium Generative Adversarial Networks", arXiv: 1703.10717v1 [cs.LG], Mar. 31, 2017, 9 pgs.
Chongxuan et al., "Triple Generative Adversarial Nets", 31st Conference on Neural Information Processing Systems (NIPS 2017), Long Beach, CA, USA, 11 pgs.
Clevert et al., "Fast and Accurate Deep Network Learning by Exponential Linear Units (ELUs)", arXiv: 1511.07289v1 [cs.LG], Nov. 23, 2015, 14 pgs.
Cristinacce et al., "Feature Detection and Tracking with Constrained Local Models", Proceedings of the British Machine Conference, Edinburgh, Scotland, Sep. 4-7, 2006, 10 pgs.

(56) References Cited

OTHER PUBLICATIONS

Dieleman et al., "Lasagne: First release", Zenodo, Software, Aug. 13, 2015, URL: http://doi.org/10.5281/zenodo.27878, 6 pgs.
Ekbatani et al., "Synthetic Data Generation for Deep Learning in Counting Pedestrians", DOI: 10.5220/0006119203180323, In Proceedings of the 6th International Conference on Pattern Recognition Applications and Methods (ICPRAM 2017), pp. 318-323.
Frans, "Variational Autoencoders Explained", kvfrans.com, Aug. 6, 2016, Retrieved from: http://kvfrans.com/variational-autoencoders-explained/, 6 pgs.
Goodfellow et al., "Generative Adversarial Nets", 2014. Generative adversarial nets. In Advances in neural information processing systems, 9 pgs.
Kingma et al., "Auto-Encoding Variational Bayes", arXiv:1312.6114v1 [stat.ML], Dec. 20, 2013, 9 pgs.
Krizhevsky, "Learning Multiple Layers of Features from Tiny Images", Apr. 8, 2009, 60 pgs.
Lemley et al., "Deep Learning for Consumer Devices and Services: Pushing the limits for machine learning, artificial intelligence, and computer vision", IEEE Consumer Electronics Magazine, vol. 6, No. 2, Apr. 2017, 18 pgs.
Liu et al., "Deep Learning Face Attributes in the Wild", Proceedings of the IEEE International Conference on Computer Vision (ICCV), Dec. 7-13, 2015, pp. 3730-3738.
Mirza et al., "Conditional Generative Adversarial Nets", arXiv:1411.1784v1 [cs.LG], Nov. 6, 2014, 7 pgs.
Odena et al., "Conditional Image Synthesis with Auxiliary Classifier GANs", arXiv: 1610.09585v1 [stat.ML], Oct. 30, 2016, 14 pgs.
Oord et al., "Pixel Recurrent Neural Networks", arXiv: 1601.06759v1 [cs.CV], Jan. 25, 2016, 10 pgs.
Radford et al., "Unsupervised Representation Learning with Deep Convolutional Generative Adversarial Networks", arXiv: 1511.06434v1 [cs.LG], Nov. 19, 2015, 15 pgs.
Rezagholizadeh et al., "Semi-supervised Regression with Generative Adversarial Networks for End to End Learning in Autonomous Driving", Under review as a conference paper at ICLR 2018, 9 pgs.
Salimans et al., "Improved Techniques for Training GANs", Proceedings of the 30th Conference on Neural Information Processing Systems, Barcelona, Spain, 2016, 9 pgs.
Wang et al., "A Hierarchical Generative Model for Eye Image Synthesis and Eye Gaze Estimation", Proceedings of the IEEE/CVF Conference on Computer Vision and Pattern Recognition, Salt Lake City, Utah, Jun. 18-23, 2018, 9 pgs.
Wang et al., "A Universal Image Quality Index", IEEE Signal Processing Letters, vol. 9, No. 3, Mar. 2002, 4 pgs.
Wang et al., "Image Quality Assessment: From Error Visibility to Structural Similarity", IEEE Transactions on Image Processing, Apr. 2004, vol. 13, No. 4, pp. 600-612.
Xiong et al., "Supervised Descent Method and its Applications to Face Alignment", Proceedings of the IEEE Conference on Computer Vision and Pattern Recognition, Jun. 23-28, 2013, 8 pgs.
Zhao et al., "Energy-based Generative Adversarial Network", arXiv:1609.03126v1 [cs.LG], Sep. 11, 2016, 15 pgs.

\* cited by examiner

505

510

515

520

1005

1010

1015

1020

US 11,797,864 B2

SYSTEMS AND METHODS FOR CONDITIONAL GENERATIVE MODELS

CROSS-REFERENCE TO RELATED APPLICATIONS

The present invention claims priority to U.S. Provisional Patent Application Ser. No. 62/686,472 entitled "Generative adversarial network", filed Jun. 18, 2018. The disclosure of U.S. Provisional Patent Application Ser. No. 62/686,472 is herein incorporated by reference in its entirety.

FIELD OF THE INVENTION

The present invention generally relates to generative adversarial networks and more specifically relates to novel and inventive methods for training conditional generative adversarial networks.

BACKGROUND

Deep learning influences almost every aspect of the machine learning and artificial intelligence. It gives superior results for classification and regression problems compared to classical machine learning approaches. Deep learning can also have significant impacts on generative models. One of the most interesting challenges in artificial intelligence is in training conditional generative models (or generators) which are able to provide labeled adversarial samples drawn from a specific distribution. Conditional generative models are models which can generate a class-specific sample given the right latent input. As one example, these generators can learn the data distribution for male/female faces and produce outputs that match a single (male/female) class.

SUMMARY OF THE INVENTION

Systems and methods for training a conditional generator model in accordance with embodiments of the invention are described. One embodiment includes a method that receives a sample, and determines a discriminator loss for the received sample. The discriminator loss is based on an ability to determine whether the sample is generated by the conditional generator model or is a ground truth sample. The method determines a secondary loss for the generated sample and updates the conditional generator model based on an aggregate of the discriminator loss and the secondary loss.

In a further embodiment, the steps of receiving, determining a discriminator loss, determining a secondary loss, and updating the conditional generator model are performed iteratively.

In still another embodiment, determining the secondary loss for a first iteration is performed using a first secondary loss model and determining the secondary loss for a second iteration is performed using a different second secondary loss model.

In a still further embodiment, the sample comprises an associated label and wherein determining the secondary loss comprises using a classification model trained to classify the sample into one of a plurality of classes.

In another embodiment, the classification model is a pre-trained model that is not modified during the training of the conditional generator model.

In yet another embodiment, determining the secondary loss comprises using a regression model trained to predict a continuous aspect of the sample.

In a yet further embodiment, determining the secondary loss comprises determining a plurality of secondary losses using a plurality of different secondary models.

In another additional embodiment, the aggregate is a weighted average of the discriminator loss and the secondary loss.

In a further additional embodiment, the steps of receiving, determining a discriminator loss, determining a secondary loss, and updating the conditional generator model are performed iteratively, wherein a weight used for calculating the weighted average is different between different iterations.

In another embodiment again, the method further generates a set of outputs using the trained conditional generator model. The set of outputs includes a set of samples and a set of associated output labels. The method trains a new model using the set of generated outputs that does not include any samples.

Additional embodiments and features are set forth in part the description follows, or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description and claims will be more fully understood with reference to the following figures and data graphs, which are presented as exemplary embodiments of the invention and should not be construed as a complete recitation of the scope of the invention.

DETAILED DESCRIPTION

Turning now to the drawings, systems and methods for training a conditional generative model and for generating conditional outputs are described below. In many embodiments, conditional generative models comprise a generator, a discriminator, and a secondary loss model. Generators and discriminators can be adversarially trained to generate outputs that approximate a "true" data set. Discriminators can be a binary classifier that determines whether a sample is generated or is a genuine sample coming from a database. Discriminators in accordance with some embodiments of the invention can be autoencoders. In a number of embodiments, generators can include a deep neural network which accepts a vector from a latent space (e.g., uniformly distributed noise) and outputs a sample of the same type as the true data set.

In a variety of embodiments, secondary loss models can be used to provide additional feedback for training a generator to be able to generate specific outputs. Secondary loss models in accordance with many embodiments of the invention can include, but are not limited to, classifiers and regressive models. In several embodiments, systems and methods train a deep conditional generator by placing a classifier in parallel with the discriminator and back propagate the classification error through the generator network. In some embodiments, secondary errors (e.g., classification error, regression error, etc.) are aggregated with a discriminator error and back propagated through a generator model. Systems and methods in accordance with a variety of embodiments of the invention can train a discriminator and a secondary loss model to generate separate losses, which can be combined to train a generator to generate conditional outputs. The method is versatile and is applicable to many variations of generative adversarial network (GAN) implementations, and also gives superior results compared to similar methods.

Conditional Generation System

Figure 1:
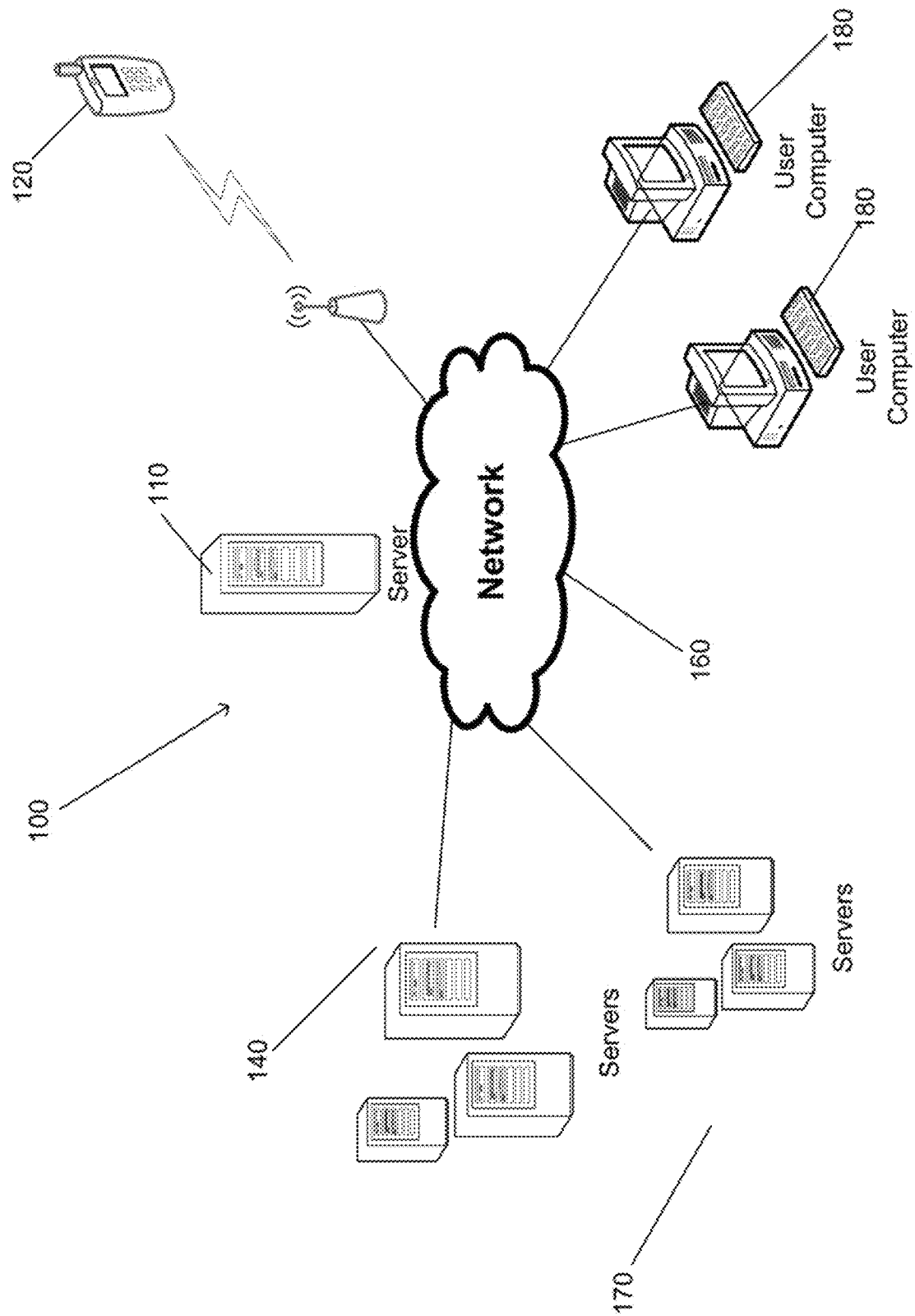
FIG. 1 illustrates an example of a system for training a conditional generative model.

A system that provides for training a conditional generative model and for generating conditional outputs in accordance with some embodiments of the invention is shown in FIG. 1. Network 100 includes a communications network 160. The communications network 160 is a network such as the Internet that allows devices connected to the network 160 to communicate with other connected devices.

Server systems 110, 140, and 170 are connected to the network 160. Each of the server systems 110, 140, and 170 is a group of one or more servers communicatively connected to one another via internal networks that execute processes that provide cloud services to users over the network 160. For purposes of this discussion, cloud services are one or more applications that are executed by one or more server systems to provide data and/or executable applications to devices over a network. The server systems 110, 140, and 170 are shown each having three servers in the internal network. However, the server systems 110, 140 and 170 may include any number of servers and any additional number of server systems may be connected to the network 160 to provide cloud services. In accordance with various embodiments of this invention, a network that uses systems and methods that train and apply conditional generative models in accordance with an embodiment of the invention may be provided by a process (or a set of processes) being executed on a single server system and/or a group of server systems communicating over network 160.

Users may use personal devices 180 and 120 that connect to the network 160 to perform processes for providing and/or interacting with a network that uses systems and methods that train and apply conditional generative models in accordance with various embodiments of the invention. In the shown embodiment, the personal devices 180 are shown as desktop computers that are connected via a conventional wired connection to the network 160. However, the personal device 180 may be a desktop computer, a laptop computer, a smart television, an entertainment gaming console, or any other device that connects to the network 160 via a wired connection. The mobile device 120 connects to network 160 using a wireless connection. A wireless connection is a connection that uses Radio Frequency (RF) signals. Infrared signals, or any other form of wireless signaling to connect to the network 160. In FIG. 1, the mobile device 120 is a mobile telephone. However, mobile device 120 may be a mobile phone, Personal Digital Assistant (PDA), a tablet, a smartphone or any other type of device that connects to network 160 via wireless connection without departing from this invention.

Conditional Generation Element

Figure 2:
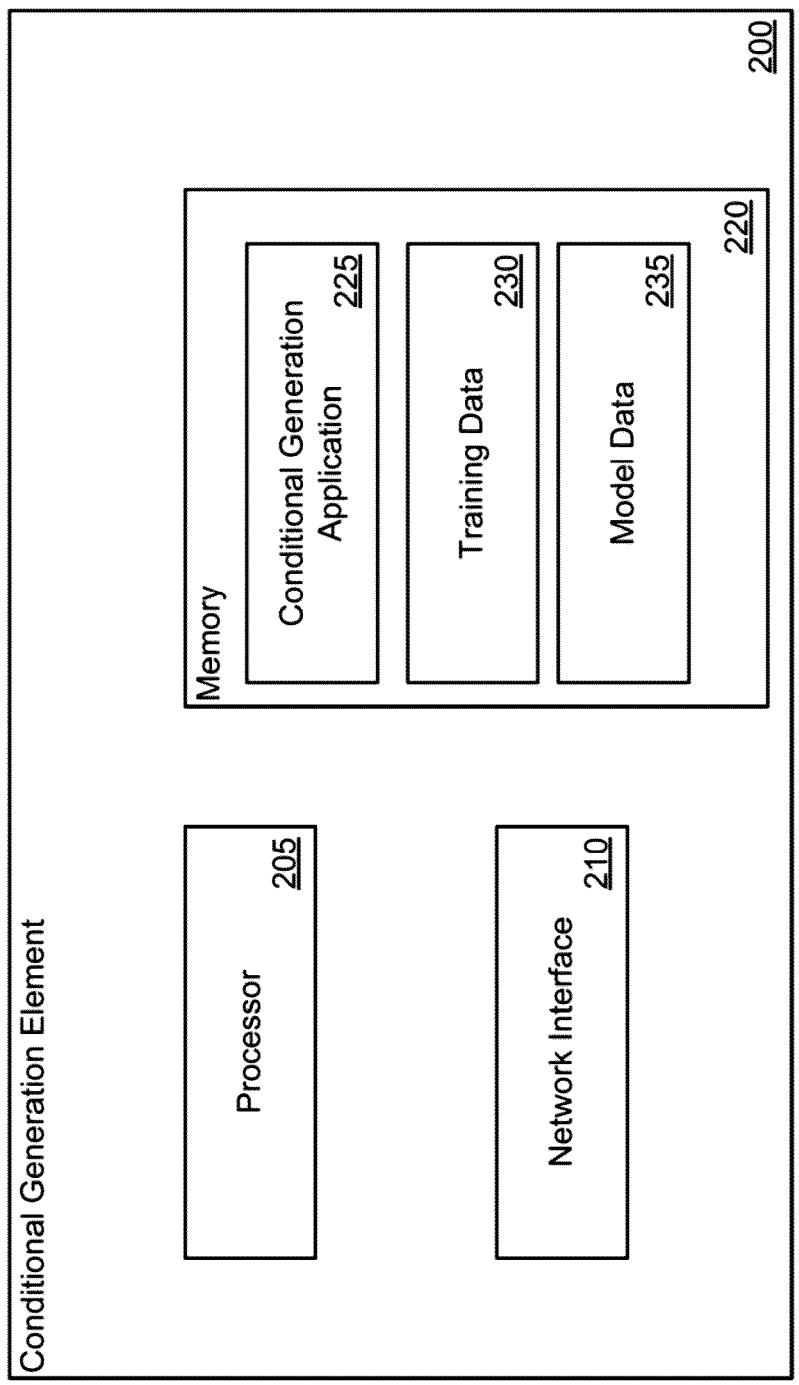
FIG. 2 conceptually illustrates an example of a process for training a conditional generative model.

A conditional generation element for training a conditional generative model in accordance with a number of embodiments is illustrated in FIG. 2. In various embodiments, conditional generation element 200 is one or more of a server system and/or personal devices within a networked system similar to the system described with reference to FIG. 1. Conditional generation element 200 includes a processor (or set of processors) 205, network interface 210, and memory 220. The network interface 205 is capable of sending and receiving data across a network over a network connection. In a number of embodiments, the network interface 205 is in communication with the memory 220. In several embodiments, memory 220 is any form of storage configured to store a variety of data, including, but not limited to, a conditional generation application 225, training data 230, and model data 235. Conditional generation application 225 in accordance with some embodiments of the invention directs the processor 205 to perform a variety of processes, such as (but not limited to) using data from training data 230 to update model parameters 235 in order train and utilize generative models to generate conditional outputs. In some embodiments, training data can include "true" data, which a conditional generator is being trained to imitate. For example, true data can include examples of human faces, which can be used to train a generator to generate new samples of human faces. Model data or parameters can include data for generator models, discriminator models, and/or secondary models.

Although a specific example of a conditional generation element is illustrated in FIG. 2, any of a variety of secure conditional generation elements can be utilized to perform processes similar to those described herein as appropriate to the requirements of specific applications in accordance with embodiments of the invention.

Conditional Generation Application

Figure 3:
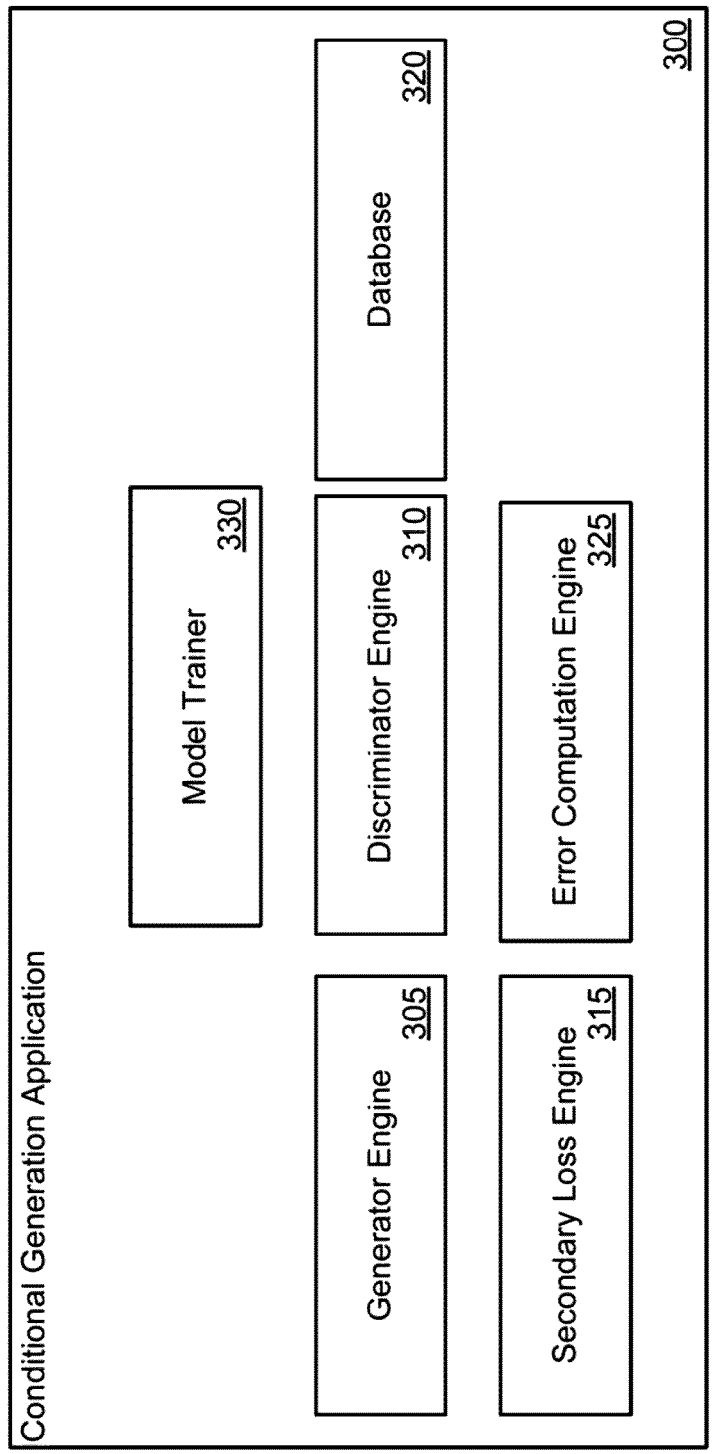
FIG. 3 conceptually illustrates an example of a process for training a conditional generative model.

A conditional generation application in accordance with a number of embodiments of the invention is illustrated in FIG. 3. In this example, conditional generation element 300 includes a generator engine 305, discriminator engine 310, secondary loss engine 315, database 320, error computation engine 325 and a model trainer 330. In this example, generator engine 305 generates sample outputs. Sample outputs and true samples from database 320 can be used to train discriminator engine 310. Secondary loss engine 315 can be trained on true samples from database 320 in accordance with a number of embodiments of the invention. Model trainer 330 trains generator engine 305 based on an aggregate error computed by error computation engine 325 from secondary loss engine 315 and discriminator engine 310. Conditional generation applications in accordance with many embodiments of the invention process data to train stochastic models that can be used to model complex probability distributions.

Generator engine 305 is a conditional generator that can be trained to generate specific types of outputs. Generator engines in accordance with various embodiments of the invention can include (but are not limited to) decoders and deconvolutional neural networks. Generator engines in accordance with many embodiments of the invention can take random samples as inputs to generate outputs similar true samples, or to match a target distribution. In many embodiments, generator engines receive a random set of inputs, along with a specified class or a continuous aspect, in order to generate an output of the specified class or with the specified continuous aspect.

Discriminator engine 310 can be used to determine whether an input (or sample) is from a target distribution, or whether it is a generated output of a generator model. Adversarial training of discriminator engines and generator engines can simultaneously train a generator to produce more realistic outputs while also training a discriminator to more effectively distinguish between generated and true inputs.

Secondary loss engine 315 can be used to refine a generator engine, such that the generator engine not only generates outputs that are similar to the target distribution, but are able to generate specific types of outputs within the target distribution. For example, a target distribution may include human faces, while a secondary loss engine may include a classifier to classify human faces as male or female. Secondary loss engines in accordance with several embodiments of the invention can include one or more models, including (but not limited to) binary classifiers, multi-class classifiers, and/or regression models. In some embodiments, secondary loss engines are pre-trained models that trained on a large corpus of training data to classify into a number of different classes. The loss from a secondary loss engine can then be used to train a generator to generate better samples of a specific class or distribution within the target population.

Error computation engine 325 can be used to compute an aggregate loss for the conditional generation application. In many embodiments, aggregate losses are a combination of a discriminator loss and one or more secondary losses from one or more secondary models. Aggregate losses in accordance with certain embodiments of the invention use a weighted combination of the discriminator and secondary loss to control the effects of each model on the training of a generator model. In some embodiments, error computation engines can change the weightings of the different losses between different epochs of training (e.g., in an alternating fashion), allowing the model to emphasize different aspects of the training in different epochs.

Although a specific example of a conditional generation application is illustrated in FIG. 3, any of a variety of secure conditional generation applications can be utilized to perform processes similar to those described herein as appropriate to the requirements of specific applications in accordance with embodiments of the invention.

Training Process

When training a conditional generative model, other solutions are often not versatile enough to be applied to different GAN variations. In some embodiments, processes can mix losses from a discriminator and a secondary model to train a generator. However, mixing the loss of discriminator and the classifier can alter the training convergence, especially if the output of the discriminator is from a different type compare to the classifier's output. For example, in certain cases, outputs from a discriminator include an image (2D matrix), while outputs of a classifier include a (1D) vector. Merging the losses for output types into a single loss can alter the convergence of the network. Systems and methods for training a conditional generator model in accordance with a number of embodiments of the invention are independent of the generator and discriminator structure, i.e., the presented method can be applied to any model that is already converging. By separating the secondary term into a separate secondary model, the secondary loss can be separated from the discriminator's loss function, facilitating the discriminator's ability converge.

Figure 4:
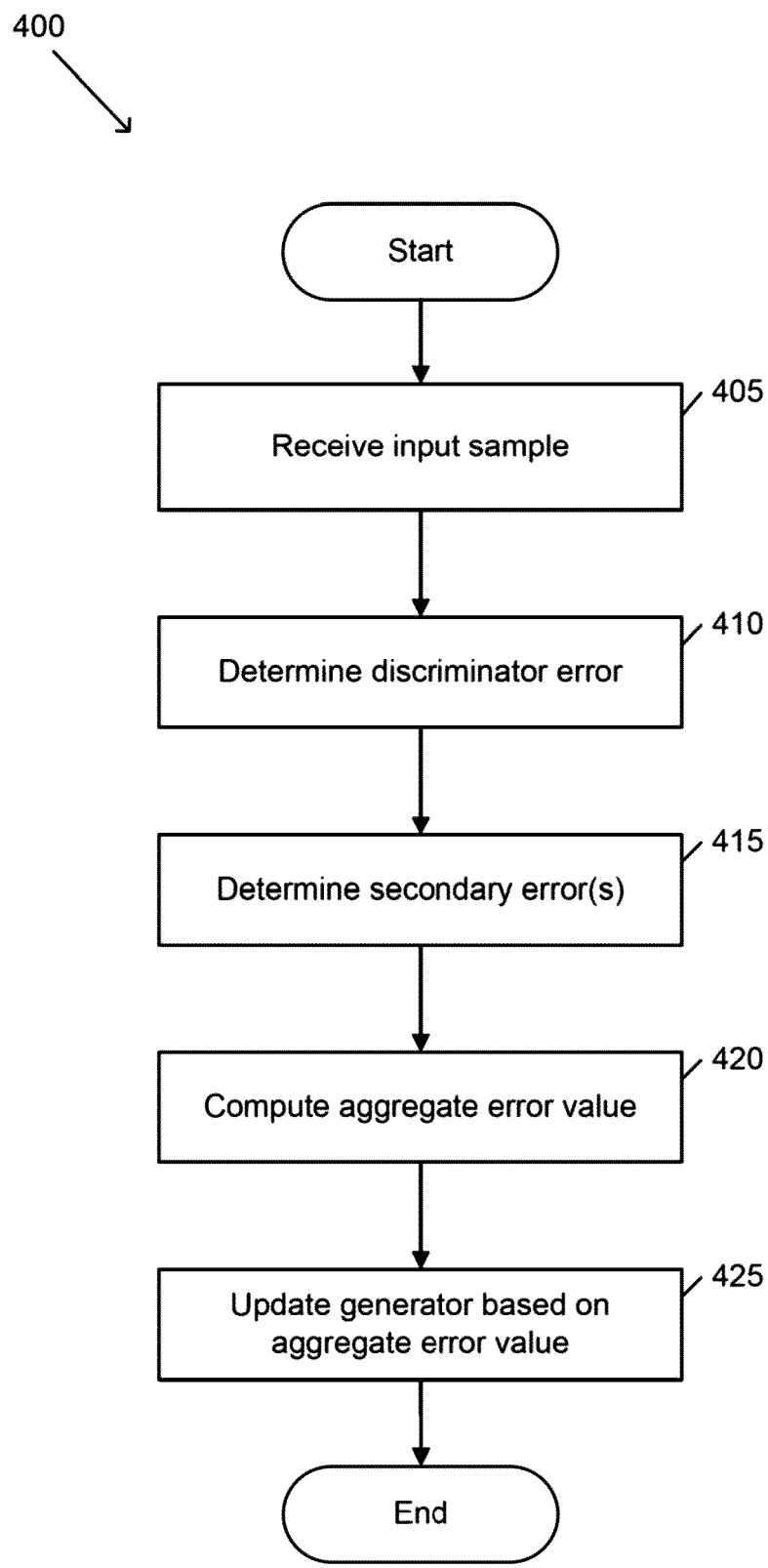
FIG. 4 conceptually illustrates an example of a process for training a conditional generative model.

An example of a process for training a conditional generator model is conceptually illustrated in FIG. 4. Process 400 receives (405) an input sample. Input samples can include ground truth samples and/or generated samples of various types including (but not limited to) images, video, text, audio, and 3D meshes. Process 400 determines (410) a discriminator loss. Determining a discriminator loss in accordance with some embodiments of the invention can include running an input sample through a binary classifier model that is trained to predict whether an input sample is a generated sample or a ground truth sample, where the output of the binary classifier model is based on the accuracy of the classifier model's prediction.

Process 400 determines (415) a secondary loss based on a secondary model. Secondary models can be pre-trained on a large corpus of inputs to compute an output (such as, but not limited to, a classification, predicted value, etc.). Secondary losses in accordance with many embodiments of the invention can be computed to determine the accuracy of the secondary model's outputs versus the expected output. In some embodiments, secondary losses can reflect a secondary model's accuracy and/or confidence in labeling an input correctly.

Process 400 computes (420) an aggregate error. Aggregate errors in accordance with some embodiments of the invention can include weighted averages of a discriminator loss and one or more secondary losses. In certain embodiments, aggregate errors can weight different losses based on a variety of factors including (but not limited to) a relative size of each loss, a desired effect for the discriminator and/or the secondary loss model, etc. In some embodiments, computation engines can change the weightings of the different losses between different epochs of training (e.g., in an alter gating fashion), allowing the model to emphasize different aspects of the training in different epochs.

Process 400 updates (425) the generator model based on the computed aggregate error. In many embodiments, computed aggregate errors are back propagated through the generator model, allowing the generator to update the weights of the model to not only generate more realistic (or true) samples, but also to be able to generate specific types or classes of samples. Processes for training a conditional generator model in accordance with a variety of embodiments of the invention can be performed iteratively while the model converges. The process 400 then ends.

Although a specific example of a process for training a conditional generator is illustrated in FIG. 4, any of a variety processes including (but not limited to) processes that utilize additional steps, fewer steps, and/or that perform the steps in a different order, can be utilized as appropriate to the requirements of specific applications in accordance with embodiments of the invention.

Secondary Loss

In many embodiments, secondary losses can include losses for any of a variety of models that can be used to refine the outputs of a generator. Secondary losses can include (but are not limited to) losses for binary classifiers, multi-class classifiers, and/or regressors. Similar methods can be applied to any GAN framework regardless of the model structures and/or loss functions. In a number of embodiments, different secondary loss models can be used for different iterations. Secondary loss models in accordance with some embodiments of the invention can include multiple different secondary loss models. Details regarding examples of different secondary structures are also described below.

Binary Classifier

In a number of embodiments, secondary losses for two-class problems are investigated. In some embodiments, classifiers can include a binary classifier with binary cross-entropy loss function.

Binary classifier The notations used in below are as follows:
1. V(G,D): is the objective function for a general generative model, wherein G and D are Generator and Discriminator.
2. The latent space Z is partitioned into $Z_1$, $Z_2$ subsets. This means that $Z_1$ and $Z_2$ are disjoint and their union is equal to the Z-space.
3. C is the classifier function.
4. $\mathcal{L}_{ce}$ is the binary cross-entropy loss function.

For a fixed Generator and Discriminator, the optimal Classifier is $$C^*_{G,D} = \frac{p_{X_1}(x)}{p_{X_1}(x) + p_{X_2}(x)} \tag{1}$$

wherein $C_{G,D}^*$ is the optimal classifier, and $p_{X_1}(x)$, and $p_{X_2}(x)$ are the distributions of generated samples for the first and second class respectively.

The objective function for the model is given by:

$$O(G,D,C) = V(G,D) + \mathcal{L}_{ce}(C) \tag{2}$$

This can be rewritten as $$O(G,D,C) = V(G,D) - \mathbb{E}_{z \sim p_{Z_1}(z)}[\log(C(G(z)))] - \mathbb{E}_{z \sim p_{Z_2}(z)}[\log(1 - C(G(z)))] \tag{3}$$

which is given by $$O(G,D,C) = V(G,D) - \{\int p_{Z_1}(z)\log(C(G(z))) + p_{Z_2}(z)\log(1 - C(G(z)))dz\} \tag{4}$$

Considering $G(z_1)=x_1$ and $G(z_2)=x_2$, $$O(G,D,C) = V(G,D) - \{\int p_{X_1}(x)\log(C(x)) + p_{X_2}(x)\log(1 - C(x))dx\} \tag{5}$$

The function $f \to m\log(f) + n\log(1-f)$ reaches its maximum at $$\frac{m}{m+n}$$

for any $(m,n) \in \mathbb{R}^2 \setminus \{0,0\}$.

The maximum value for $\mathcal{L}_{ce}(C)$ is $\log(4)$ and is achieved if and only if $p_{X_1} = p_{X_2}$. For $p_{X_1} = p_{X_2} \Rightarrow C_{G,D}^* = \frac{1}{2}$ and by observing that $$-\mathcal{L}_{ce}(C) = \mathbb{E}_{x \sim pX_1(x)}(\log(C(x))) + \mathbb{E}_{x \sim pX_2(x)}(\log(1 - C(x))) \tag{6}$$

results in $$\mathcal{L}_{ce}(C^*_{G,D}) = -\log(\tfrac{1}{2}) - \log(\tfrac{1}{2}) = \log(4) \tag{7}$$

To show that this is the maximum value, from equation 5, $$\mathcal{L}_{ce}(C^*_{G,D}) = -\int p_{X_1}(x)\log\left(\frac{p_{X_1}(x)}{p_{X_1}(x) + p_{X_2}(x)}\right)dx - \int p_{X_2}(x)\log\left(\frac{p_{X_2}(x)}{p_{X_1}(x) + p_{X_2}(x)}\right)dx \tag{8}$$

which is equal to $$\mathcal{L}_{ce}(C^*_{G,D}) = \log(4) - \int p_{X_1}(x)\log\left(\frac{p_{X_1}(x)}{\frac{p_{X_1}(x) + p_{X_2}(x)}{2}}\right)dx - \int p_{X_2}(x)\log\left(\frac{p_{X_2}(x)}{\frac{p_{X_1}(x) + p_{X_2}(x)}{2}}\right)dx \tag{9}$$

results in $$\mathcal{L}_{ce}(C^*_{G,D}) = \log(4) - KL\left(p_{X_1}(x) \| \frac{p_{X_1}(x) + p_{X_2}(x)}{2}\right) - KL\left(p_{X_2}(x) \| \frac{p_{X_1}(x) + p_{X_2}(x)}{2}\right) \tag{10}$$

Where K is the Kullback-Leibler divergence, which is always positive or equal to zero.

Minimizing the binary cross-entropy loss function $\mathcal{L}_{ce}$ for the classifier C is increasing the Jensen-Shannon divergence between $p_{X_1}$ and $p_{X_2}$, the Jensen-Shannon divergence between $p_1$ and $p_2$ is given by $$JSD(p_1 \| p_2) = \frac{1}{2}KL\left(p_1 \| \frac{p_1 + p_2}{2}\right) + \frac{1}{2}KL\left(p_2 \| \frac{p_1 + p_2}{2}\right) \tag{11}$$

considering equation 10 and 11, it gives $$\mathcal{L}_{ce}(C^*_{G,D}) = \log(4) - 2JSD(p_{X_1} \| p_{X_2}) \tag{12}$$

minimizing $\mathcal{L}_{ce}$ is equal to maximizing $JSD(P_{X_1} \| p_{X_2})$.

As shown, placing the classifier C and adding its loss value the generative framework in accordance with a number of embodiments of the invention can push the generator to increase the distance of samples that are drawn from a specific class with respect to the other class. Processes in accordance with many embodiments of the invention can increase the Jensen Shannon Divergence (JSD) between classes generated by the deep generator so that the generator can produce samples drawn from a desired class. For example, in the male/female face scenario, a partition of Z space can be used to generate male and another partition to generate female samples.

Multi-Class Classifier

In a number of embodiments, secondary losses for multi-class problems are investigated. In such cases, the classifier can be a multiple class classifier with a categorical cross-entropy loss function.

The terms used below are as follows:
1. N is the number of the classes.
2. The latent space Z is partitioned in to $\{Z_1, Z_2, \ldots, Z_N\}$ subsets. This means that $\{Z_1, Z_2, \ldots, Z_N\}$ are disjoint and their union is equal to the Z-space.
3. C is the classifier function.
4. $\mathcal{L}_{ce}$ is the binary cross-entropy loss function.
5. $\mathcal{L}_{cce}$ is the categorical cross-entropy loss function.

In the multiple classes case, the classifier C has N outputs, where N is the number of the classes. In this approach, each output of the classifier can correspond to one class. For a fixed Generator and Discriminator, the optimal output for class c (c'th output) is:

$$C^*_{G,D}(c) = \frac{p_{X_c}(x)}{\sum_{i=1}^{N} p_{X_i}(x)} \tag{13}$$

Considering just one of the outputs of the classifier, the categorical cross-entropy can be reduced to binary cross-entropy given by $$\mathcal{L}_{ce}(C(c)) = -\mathbb{E}_{z \sim p_{Z_c}(z)}[\log(C(G(z)))] - \mathbb{E}_{z \sim \Sigma_{i \neq c} p_{Z_i}(z)}[1 - \log(C(G(z)))] \tag{14}$$

which is equal to $$\mathcal{L}_{ce}(C(c)) = \int p_{Z_c}(z)\log(C(G(z))) + \left(\sum_{i \neq c} p_{Z_i}(z)\right)\log(1 - C(G(z))dz) \tag{15}$$

By considering $G(z_i) = x_i$, $$\mathcal{L}_{ce}(C(c)) = \int p_{Z_c}(z)\log(C(G(z))) + \left(\sum_{i \neq c} p_{Z_i}(z)\right)\log(1 - C(G(z))dz) \tag{16}$$

The function $f \to m \log(f) + n \log(1-f)$ gets its maximum at $$\frac{m}{m+n}$$

for $(m,n) \in \mathbb{R}^2 \setminus \{0,0\}$. The maximum value for $\mathcal{L}_{cce}(C)$ is $N \log(N)$ and is achieved if and only if $p_{X_1} = p_{X_2} = \ldots = p_{X_N}$. The categorical cross-entropy is given by $$\mathcal{L}_{cce} = -\sum_{i=1}^{N} \mathbb{E}_{z \sim p_{Z_i}}(z)[\log(C(G(z)))] \tag{17}$$

$$= -\sum_{i=1}^{N} \int p_{X_i}(x)\log(C(x))dx$$

From equation 13, $$\mathcal{L}_{cce} = -\sum_{i=1}^{N} \left(\int p_{X_i}(x)\log\left(\frac{p_{X_i}(x)}{\sum_{j=1}^{N} p_j(x)}\right)dx\right) \tag{18}$$

$$= -\sum_{i=1}^{N} \left(\int p_{X_i}(x)\log\left(\frac{p_{X_i}(x)}{\sum_{j=1}^{N} \frac{p_j(x)}{N}}\right)dx\right) + N\log(N)$$

$$= N\log(N) - \sum_{i=1}^{N} KL\left(p_{X_i}(x) \| \sum_{j=1}^{N} \frac{p_{X_j}(x)}{N}\right)$$

where KL is the Kullback-Leibler divergence, which is always positive or equal to zero.

Now consider $p_{X_1} = p_{X_2} = \ldots = p_{X_N}$. From equation 18, $$\mathcal{L}_{cce} = N\log(N) - \sum_{i=1}^{N} KL(p_{X_i}(x) \| p_{X_i}(x)) \tag{19}$$

$$= N\log(N)$$

It can be shown that minimizing $L_{cce}$ increases the Jensen-Shannon Divergence between $p_{X_1}, p_{X_2}, \ldots p_{X_N}$. From equation 18, $$\mathcal{L}_{cce} = \tag{20}$$

$$N\log(N) - \int \sum_{i=1}^{N} \left(p_{X_i}(x)\left[\log(p_{X_i}(x)) - \log\left(\sum_{j=1}^{N} \frac{p_{X_j}(x)}{N}\right)\right]\right)dx$$

which can be rewritten as $$\mathcal{L}_{cce} = N\log(N) - \sum_{i=1}^{N} \left(\int p_{X_i}(x)\log(p_{X_i}(x))dx\right) + \tag{21}$$

$$\int \sum_{i=1}^{N} \left(p_{X_i}(x)\log\left(\sum_{j=1}^{N} \frac{p_{X_j}(x)}{N}\right)\right)dx$$

$$\left(\sum_{i=1}^{N} p_{X_i}(x)\right)\left(\log\left(\sum_{j=1}^{N} \frac{p_{X_j}(x)}{N}\right)\right)$$

which is equal to $$\mathcal{L}_{cce} = N\log(N) - N\sum_{i=1}^{N}\left(\frac{1}{N}\int p_{X_i}(x)\log(p_{X_i}(x))dx\right) + \tag{22}$$

$$N\int\left(\sum_{i=1}^{N} \frac{p_{X_i}(x)}{N}\right)\left(\log\left(\sum_{j=1}^{N} \frac{p_{X_j}(x)}{N}\right)\right)dx$$

This equation can be rewritten as $$\mathcal{L}_{cce} = N\log(N) - \left[ H\left(\sum_{i=1}^{N} \frac{1}{N} p_{X_i}(x)\right) - \sum_{i=1}^{N} \frac{1}{N} H(p_{X_i}(x)) \right] \quad (23)$$

wherein the H(p) is the Shannon entropy of the distribution p. The Jensen Shannon divergence between N distributions $p_{X_1}, P_{X_2}, \ldots p_{X_N}$, is defined as $$JSD_{\pi_1, \pi_2, \ldots, \pi_N}(p_1, p_2, \ldots, p_N) = H\left(\sum_{i=1}^{N} \pi_i p_i\right) - \sum_{i=1}^{N} \pi_i H(p_i) \quad (24)$$

From equations 23 and 24, $$\mathcal{L}_{cce} = N\log(N) - N JSD_{\frac{1}{N}, \frac{1}{N}, \ldots, \frac{1}{N}}(p_{X_1}(x), p_{X_2}(x), \ldots, p_{X_N}(x)) \quad (25)$$

Accordingly, minimizing $L_{cce}$ increases the JSD term.

Regressor

In some embodiments secondary losses can include losses for a regression network. A new loss function in accordance with a variety of embodiments of the invention can be used in conjunction with a regression network. In numerous embodiments, the regression error can be back-propagated through the generator, allowing the generator to be trained while constraining the generated samples to any continuous aspect of the original database. For example in a face generation application, given the right latent sequence, a generator can be trained to create faces with particular landmarks.

The following loss function is introduced for the regression network.

$$L_R = \iint dp_z(z)(-\log(1-(y-R(G(z)))))dz \quad (26)$$

wherein z is the latent space variable $dp_z(z)$ is the distribution of an infinitesimal partition of latent space, y is the target variable (ground truth), R is the regression function and G is the generator function. For the loss function in equation 26 the optimal regressor is $$R^* = \frac{p(x)}{c} + y - 1 \quad (27)$$

wherein p(x) is the distribution of the generator's output, c is post-integration constant, and y is the target function.

Considering the inner integration of equation 26 and by replacing G(z)=x, the extremum of the loss function with respect to R is $$\frac{d}{dR}\int dp_x(x)(-\log(1-(y-R(x))))dx = 0 \quad (28)$$

which can be written as $$\int \frac{-dp_x}{R-y+1} = 0 \Rightarrow \frac{p_x}{R-y+1} = c \quad (29)$$

this results in $$R = \frac{p(x)}{c} + y - 1 \quad (30)$$

Minimizing the loss function in equation 26 decreases the entropy of the generator's output. By replacing equation 27 in 26, $$L_R = \iint -\log\left(\frac{p_x(x)}{c}\right)dp_x dx \quad (31)$$

which can be rewritten as $$L_R = -\int p_x(x)\log(p_x(x))dx + \log(c) = H(p_x(x)) + \log(c) \quad (32)$$

wherein H is the Shannon entropy. Minimizing $L_R$ results in decreasing $H(p_x(x))$.

Adding the regressor to the model decreases the entropy of the generated samples. This is expectable since the idea is to constrain the output of the generator to obey some particular criteria. For any two sets of samples and their corresponding targets (y1 and y2), the loss function in equation 1 increases the Jensen Shannon Divergence (JSD) between generated samples for these two sets. Consider z1 and z2 are two partitions of the latent space correspond to two sets of samples with targets y1 and y2. In this case, the loss function in equation 26 is given by:

$$L_R = -\int p_{z_1}(z)\log(1-(y_1-R(G(z_1))))dz - \int p_{z_2}(z)\log(1-(y_2-R(G(z_2))))dz \quad (33)$$

Considering G(z1)=$x_1$, G(z2)=$x_2$, $c_1=1-y_1$ and $c_2=1-y_2$ equation 33 simplifies to $$L_R = -\int p_{x_1}(x)\log(c_1+R(x))dx - \int p_{x_2}(x)\log(c_2+R(x))dx \quad (34)$$

To find the optimum R(x) the derivative of the integrand is set to zero given by $$\frac{p_{x_1}}{c_1+R} + \frac{p_{x_2}}{c_2+R} = 0 \quad (35)$$

which results in $$R = -\frac{p_{x_1}c_2 + p_{x_2}c_1}{p_{x_1}+p_{x_2}} \quad (36)$$

By replacing equation 36 in equation 34 it simplifies to $$L_R = -\int p_{x_1}\log\left(\frac{(c_1-c_2)p_{x_1}}{p_{x_1}+p_{x_2}}\right)dx - \int p_{x_2}\log\left(\frac{(c_2-c_1)p_{x_2}}{p_{x_1}+p_{x_2}}\right)dx \quad (37)$$

which can be rewritten as $$R_L = -\int \log\left(\frac{p_{x_1}}{\frac{p_{x_1}+p_{x_2}}{2}}\right) - \int \log\left(\frac{p_{x_2}}{\frac{p_{x_1}+p_{x_2}}{2}}\right) - \log(c_1-c_2) - \log(c_2-c_1) - \log(4) \quad (38)$$

which equals to $$R_L = -\log(c_1-c_2) - \log(c_2-c_1) - \log(4) - 2\mathrm{JSD}(p_{x_1}\|p_{x_2}) \quad (39)$$

minimizing $R_L$, increasing $\mathrm{JSD}(p_{x_1}\|p_{x_2})$ term. In this section, it has been shown that the presented loss function increases the distance between generated samples for any two set of aspects, which can be desirable.

Although specific examples of loss functions are described above, one skilled in the art will recognize that other loss functions can be utilized as appropriate to the requirements of specific applications in accordance with embodiments of the invention.

Example Outputs

Figure 5:
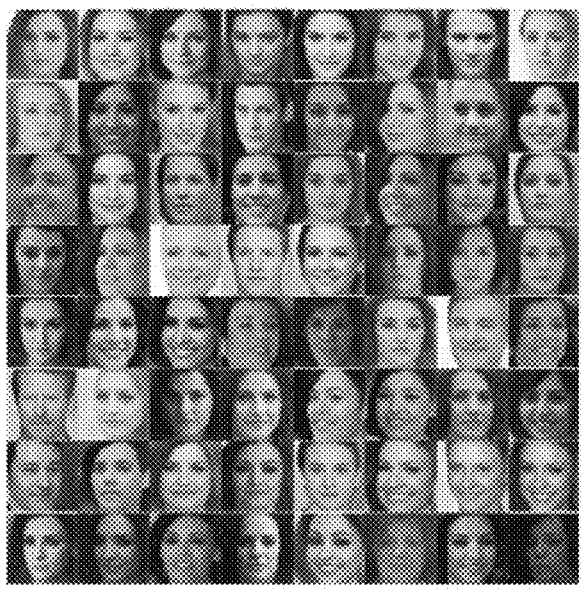
FIG. 5 illustrates sample outputs for a process that implements a binary classifier in accordance with an embodiment of the invention.
Figure 5:
Figure 5:
Figure 5:

Sample outputs for a process that implements a binary classifier in accordance with an embodiment of the invention are illustrated in FIG. 5. Images 505 and 515 show generated images of female and male faces respectively using other methods known in the art. Images 510 and 520 show samples of generated female and male images using methods in accordance with various embodiments of the invention. As it is shown in these figures, the gender-specific generator fails to correctly generate samples for a specific class when the conditional GAN is applied. The samples generated using methods in accordance with embodiments of the invention can result in greater diversity and higher quality images that are better constrained to the different classes.

Figure 6:
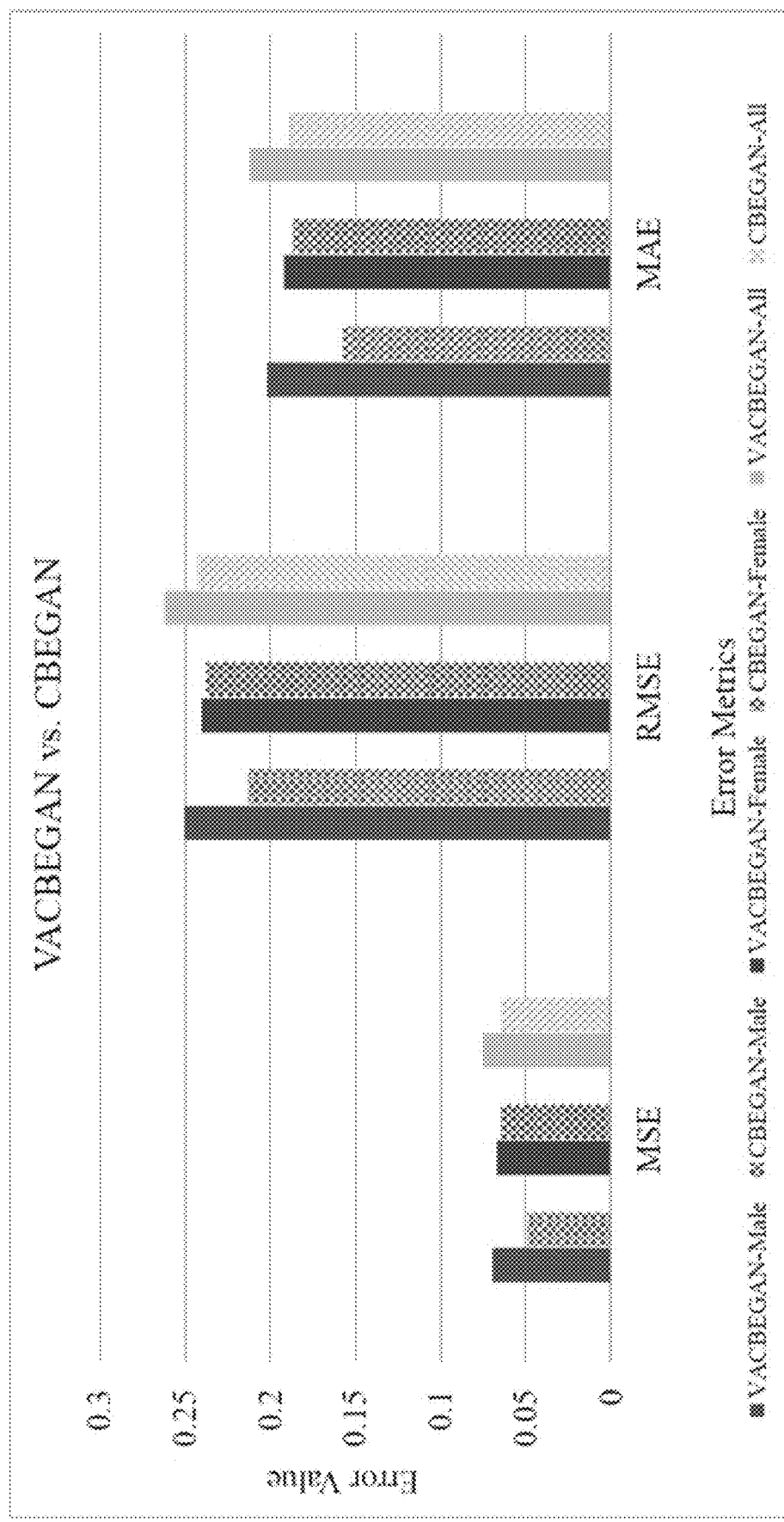
FIG. 6 illustrates the measured diversity measurements for a binary classifier for the sample outputs.
Figure 7:
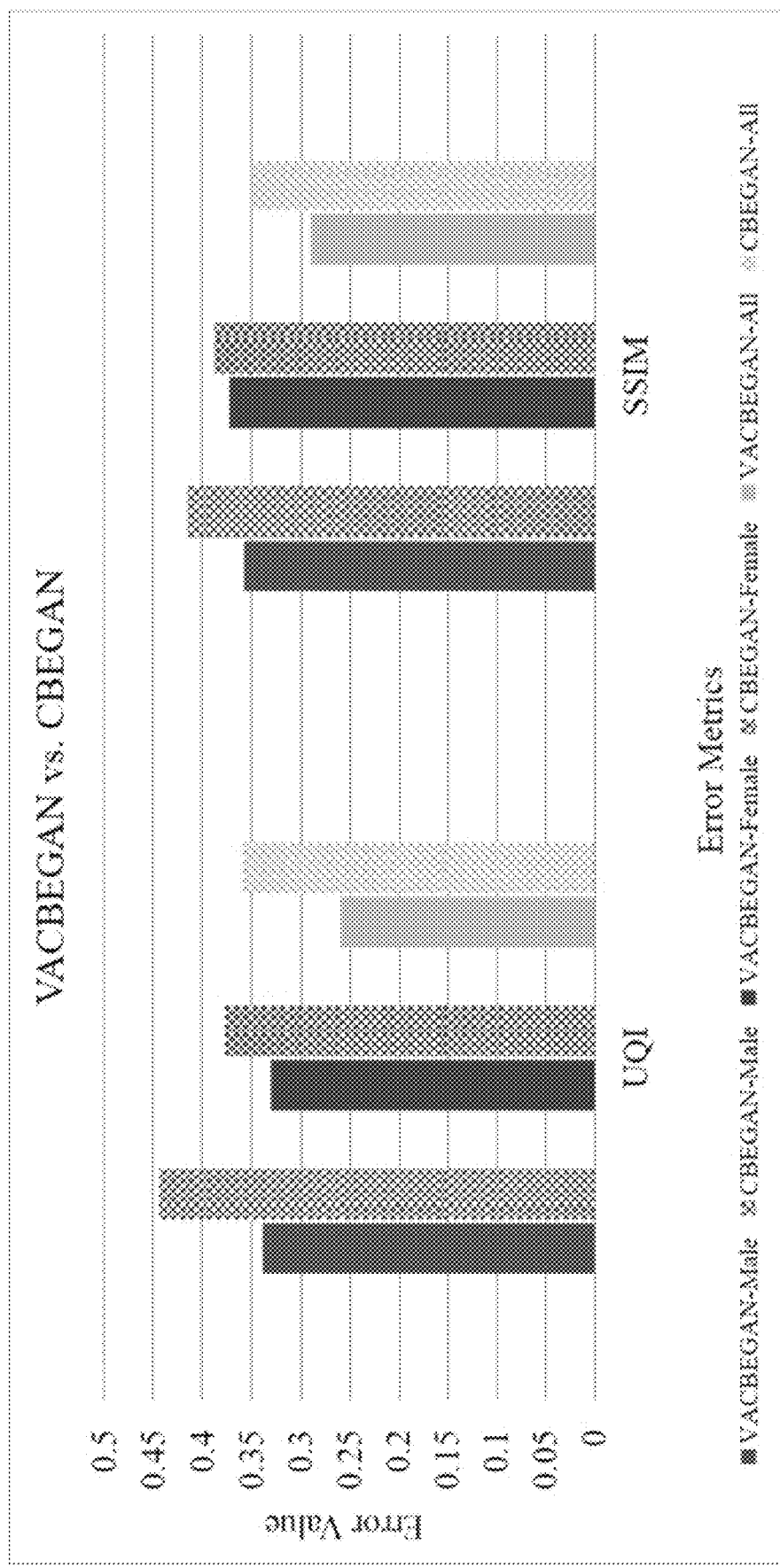
FIG. 7 illustrates the measured image quality measurements for a binary classifier for the sample outputs.

FIGS. 6 and 7 show various results of the different samples. In these charts, the different sets of bars represent:
1. Each male sample has been compared to all the other male samples, and all the metrics have been calculated for these comparisons, and the average of these numbers has been obtained (first set of bars).
2. Each female sample has been compared all the other female samples, and all the metrics have been calculated for these comparisons, and the average of these numbers has been obtained (second set of bars).
3. Each male samples has been compared to all female samples, and all the metrics have been calculated for these comparisons, and the average of these numbers has been obtained (third set of bars).

FIG. 6 shows the measured diversity measurements for a binary classifier according to a number of different error metrics (or diversity metrics). Specifically, FIG. 6 compares mean squared error (MSE), root mean squared error (RMSE), and mean absolute error (MAE) for the different generation methods. The higher value of MSE, RMSE, and MAE shows the higher variation of the generated images.

FIG. 7 shows a comparison of different image quality metrics for the different methods. The lower value of universal quality index (UQI) and structural similarity index (SSIM) shows the lower levels of similarity between samples. In FIG. 7, from the first two observations it is shown that the proposed method is able to generate samples in each class that are not similar. From the third observation, it is shown that the inter-class similarity in the proposed method is less than previously known methods, where the generated samples from different classes are less similar to each other.

Figure 8:
FIG. 8 conceptually illustrates an example of a process for training a conditional generative model.
Figure 8:
Figure 9:
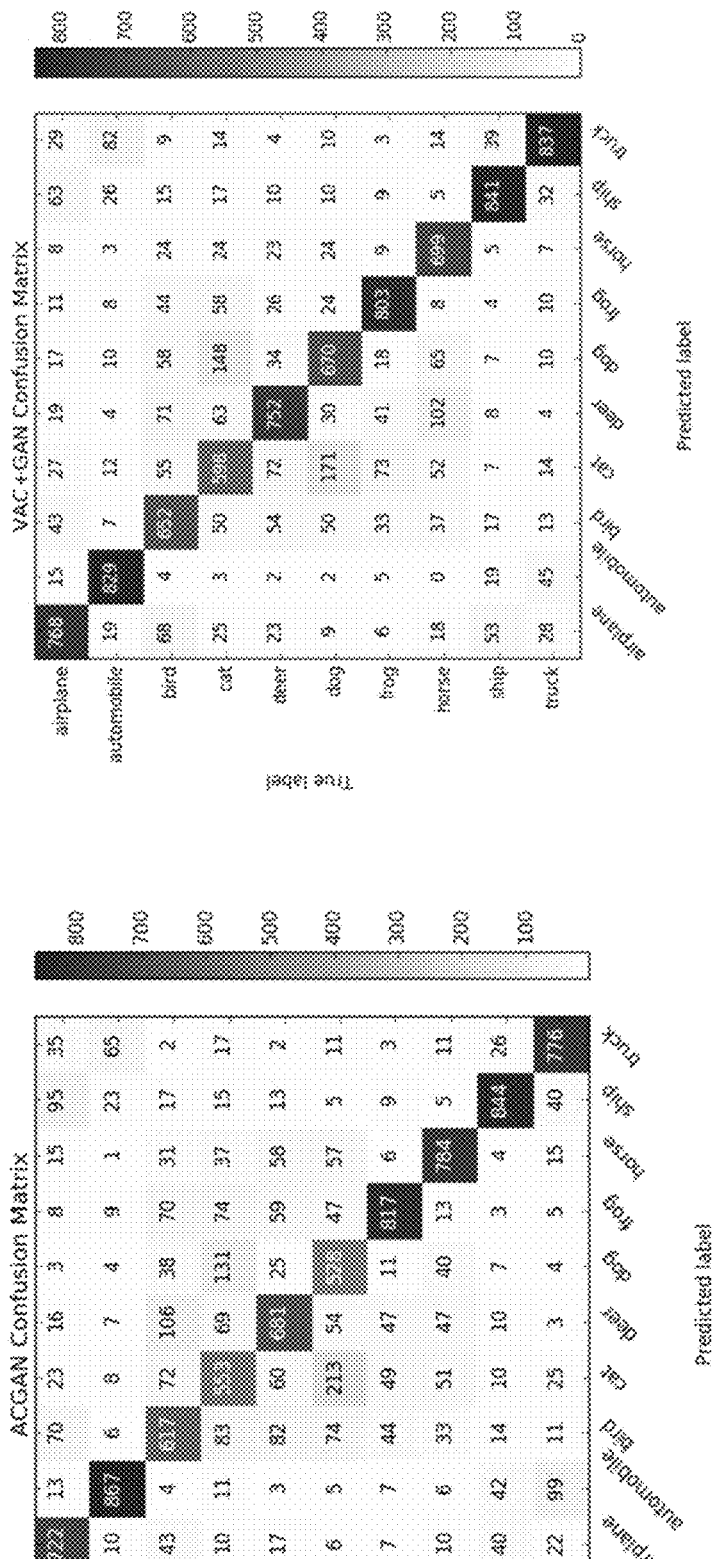
FIG. 9 conceptually illustrates an example of a process for training a conditional generative model.

Sample outputs for a process that implements a multi-class model are illustrated in FIG. 8. In this example, elements 805 were generated using an ACGAN method. Elements 810 were generated using methods in accordance with numerous embodiments of the invention. Classification accuracy for the different models are illustrated in the confusion matrices of FIG. 9. The proposed method gives higher accuracy while also providing versatility, as it allows for the flexible use of any of a variety of different classifier networks.

Figure 10:
FIG. 10 illustrates sample outputs for a process that implements a regression model for secondary loss in accordance with an embodiment of the invention.
Figure 10:
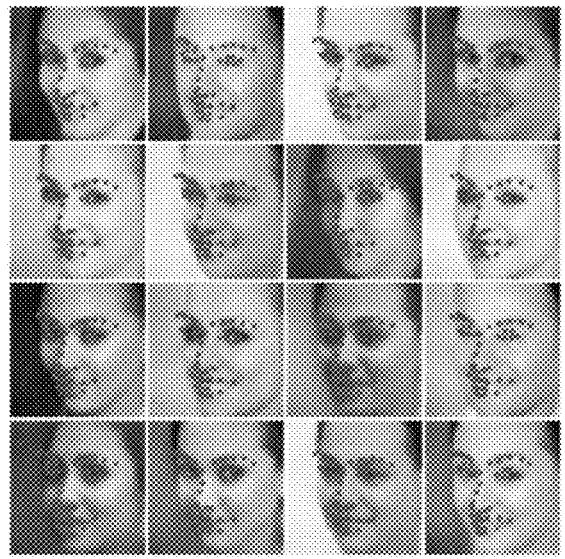
Figure 10:
Figure 10:

Sample outputs for a process that implements a regression model for a secondary loss in accordance with an embodiment of the invention are illustrated in FIG. 10. Images 1005 and 1015 show generated images of faces that are generated based on two different sets of landmarks using other methods known in the art. Images 1010 and 1020 show samples of generated faces using the same respective sets of landmarks using methods in accordance with various embodiments of the invention. As can be seen in these examples, the samples generated using methods in accordance with embodiments of the invention can result in higher quality images, and a greater diversity in the generated faces.

Outputs generated by a conditional generator in accordance with numerous embodiments of the invention can be used to train a new model. Generated outputs in accordance with some embodiments of the invention can include (but are not limited to) images, text, labels, and other forms of data. In numerous embodiments, the new model is trained solely on generated outputs, and does not include any data from a ground truth database of real images. By using such generated images, sensitive information from a ground truth database s, health information, etc.) can be protected and training dataset, while still allowing d to be trained on a realistic distribution of data.

Although the present invention has been described in certain specific aspects, many additional modifications and variations would be apparent to those skilled in the art. It is therefore to be understood that the present invention may be practiced otherwise than specifically described. Thus embodiments of the present invention should be considered in all respects as illustrative and not restrictive.

What is claimed is:

1. A method for training a conditional generator model, the method comprising:
receiving a sample;
determining a discriminator loss for the received sample, wherein the discriminator loss is based on an ability to determine whether the sample is generated by the conditional generator model or is a ground truth sample;
determining a plurality of secondary losses for the generated sample using a binary classification model, a multi-class classification model and a regression model, wherein the binary classification model, the multi-class classification model and the regression model are within the conditional generator model;
updating the conditional generator model based on an aggregate of the discriminator loss and the plurality of secondary losses; and
generating images with one or more landmarks, wherein the generated images have higher diversity than the received sample.

2. The method of claim 1, wherein the steps of receiving, determining a discriminator loss, determining a plurality of secondary losses, and updating the conditional generator model are performed iteratively.

3. The method of claim 2, wherein determining the secondary loss for a first iteration is performed using a first secondary loss model and determining the secondary loss for a second iteration is performed using a different second secondary loss model.

4. The method of claim 1, wherein the sample comprises an associated label and wherein the multi-class classification model is trained to classify the sample into one of a plurality of classes.

5. The method of claim 4, wherein the classification model is a pre-trained model that is not modified during the training of the conditional generator model.

6. The method of claim 1, wherein the regression model is trained to predict a continuous aspect of the sample.

7. The method of claim 1, wherein the aggregate is a weighted average of the discriminator loss and the plurality of secondary losses.

8. The method of claim 7, wherein the steps of receiving, determining a discriminator loss, determining a plurality of secondary losses, and updating the conditional generator model are performed iteratively, wherein a weight used for calculating the weighted average is different between different iterations.

9. The method of claim 1 further comprising:
generating a set of outputs using the trained conditional generator model, wherein the set of outputs comprises a set of samples and a set of associated output labels; and
training a new model using the set of generated outputs that does not include any samples.

10. A system comprising memory and one or more processors configured to:
receive a sample;
determine a discriminator loss for the received sample, wherein the discriminator loss is based on an ability to determine whether the sample is generated by a conditional generator model or is a ground truth sample;
determine a plurality of secondary losses for the sample using a binary classification model, a multi-class classification model and a regression model, wherein the binary classification model, the multi-class classification model and the regression model are within the conditional generator model;
update the conditional generator model based on an aggregate of the discriminator loss and the plurality of secondary losses; and
generating images with one or more landmarks, wherein the generated images have higher diversity than the received sample.

11. The system of claim 10, wherein the receiving, determining a discriminator loss, determining a plurality of secondary losses, and updating the conditional generator model are performed iteratively.

12. The system of claim 11, wherein the one or more processors are configured to determine the secondary loss for a first iteration using a first secondary loss model and determining the secondary loss for a second iteration is performed using a different second secondary loss model.

13. The system claim 10, wherein the sample comprises an associated label and wherein the multi-class classification model is trained to classify the sample into one of a plurality of classes.

14. The system of claim 13, wherein the classification model is a pre-trained model that is not modified during the training of the conditional generator model.

15. The system of claim 10, wherein the regression model is trained to predict a continuous aspect of the sample.

16. The system of claim 10, wherein the aggregate is a weighted average of the discriminator loss and the secondary loss.

17. The system of claim 16, wherein the receiving, determining a discriminator loss, determining a secondary loss, and updating the conditional generator model are performed iteratively, wherein a weight used for calculating the weighted average is different between different iterations.

18. The system of claim 10, wherein the one or more processors are further configured to:
generate a set of outputs using the trained conditional generator model, wherein the set of outputs comprises a set of samples and a set of associated output labels; and
train a new model using the set of generated outputs that does not include any samples.

* * * * *